Aug. 28, 1956

P. LAMBERT ET AL 2,760,850

TANK REACTOR

Filed Nov. 23, 1951

INVENTORS
Pierre Lambert,
Wheaton W. Kraft &
Thomas C. Williamson

BY Nathaniel Ely
ATTORNEY

United States Patent Office 2,760,850
Patented Aug. 28, 1956

2,760,850

TANK REACTOR

Pierre Lambert, Chappaqua, Thomas C. Williamson, Port Washington, and Wheaton W. Kraft, Scarsdale, N. Y., assignors to The Lummus Company, New York, N. Y., a corporation of Delaware Application November 23, 1951, Serial No. 257,718

3 Claims. (Cl. 23—285)

This invention relates to improvements in contact apparatus for fluid contact and more specifically to a cascade type reactor for reacting acids with other liquids as in the alkylation of hydrocarbons.

The alkylation process for making very high octane fuel is based on the combination of iso-butane with butylene in the presence of nearly pure sulfuric acid. It is an expensive manner of producing aviation gasoline which war time urgencies have justified. Every effort has been made under the circumstances to reduce equipment cost, increase product yield, to reduce the consumption of acid and to reduce the amount of recycle which appears to be necessary to obtain maximum quality of end product.

In accordance with our present invention, we now find it possible to obtain higher yields of alkylate than heretofore thought possible and can better control the reaction to produce the minimum amount of recycle of acids and to maintain the most effective conditions in the respective contacting sections.

A major feature of our invention is the provision of a settling trap adjacent each of the reaction sections of an alkylation reactor to permit separation of acid from alkylate whereby the major portion of the acid is retained in the reaction chamber for maximum reactivity and only a small amount of acid is withdrawn and reintroduced at a later stage to insure a predetermined purity of acid composition.

Further objects and advantages of the invention will appear from the following description of a preferred form of embodiment thereof taken in connection with the drawing attached in which.

Figure 1:
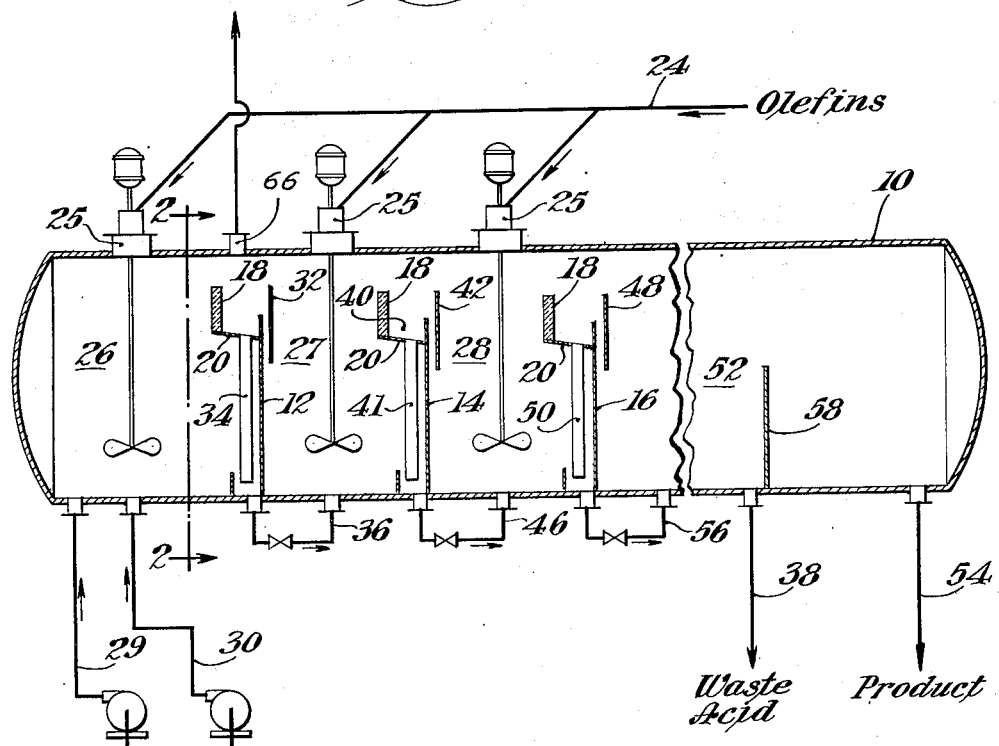
Fig. 1 is a central vertical section through a reactor with a line drawing of attached fluid circuits.
Figure 2:
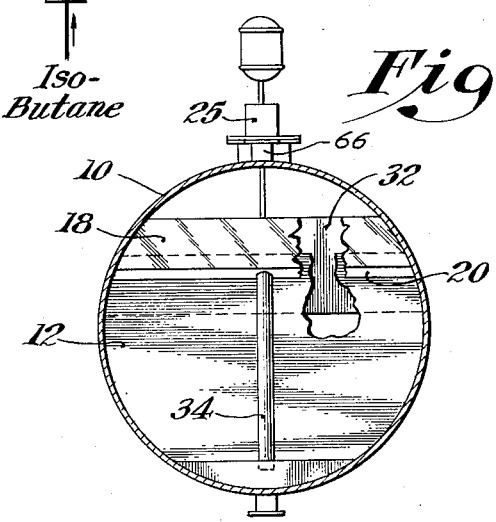
Fig. 2 is a transverse vertical section taken substantially on the line 2—2 of Fig. 1.

The reaction vessel 10 in accordance with our invention is a generally cylindrical horizontal tank having external nozzles for interconnection of liquid lines as hereinafter described. Internally the tank is provided with transverse baffles 12, 14, and 16 which extend about two-thirds the way up from the bottom and are impervious to the liquid in the tank. These divide the tank into a plurality of distinct treating zones or compartments generally indicated at 26, 27, and 28.

Each of these treating zones 26, 27, and 28 is provided with suitable motor driven agitators 25 which also provide for the introduction of the liquid olefins from line 24 into the reaction zones and for mixing the olefins and the accumulated acid in the well known manner. The agitation and reaction proceeds in accordance with well known principles to forming an alkylate and a partially depleted acid. The unreacted hydrocarbon phase containing the alkylate so formed is then cascaded to the second and third (or more) reaction chambers 27 and 28.

In accordance with our invention, we provide a pervious baffle member or barrier 18 which extends above each of the baffles 12, 14, and 16 and is connected thereto by a slightly inclined bottom plate member 20. These bottom plate members 20 are attached to the baffle members 12, 14, and 16 along a line below their tops thus forming separate wells or traps. These traps are provided with draw off conduits 34, 41, and 50.

In operation of the reactor, a liquid level is maintained in zone 26 to the top of the impervious baffle member 12. As the pervious baffle or barrier is made of glass wool, fibre glass, stainless steel or other suitable coalescing material, the acid and hydrocarbons will pass through without foam or agitation while the acid will be coalesced and coagulated for gravitational settling in the trap section. The hydrocarbons which tend to rise to the top of the mixture, will pass over weir 12 into the second compartment 27. The bulk of the acid is drawn off through the downcomer 34 and is returned to compartment 26.

In a similar manner, the bulk of the acid from compartment 27 will settle out in trap 40, and pass downward through downcomer 41 while the further alkylated material will pass over weir 14 into the third compartment 28. The acid is returned to compartment 27.

The hydrocarbons from the third compartment 28 are similarly discharged over weir 16 and the settled acid drawn off through downcomer 50 for return to compartment 28.

The acid that carried over weir 16 along with the hydrocarbons is settled in compartment 52. The spent acid is withdrawn through line 38 and discarded at a rate sufficient to maintain the desired minimum acid concentration in the final reaction chamber 28. The hydrocarbons including the alkylated product pass over the weir 58 and are removed through line 54. It will be appreciated that temperature and pressure will be maintained by customary means thereby providing for the optimum conditions. Cooling may be accomplished by internal evaporation by removing vapor from the reactor through the opening 66, compressing and condensing it, and returning it to the reactor as a liquid along with the isobutane feed.

The operation of this unit in the sulfuric acid alkylation of hydrocarbons is of particular advantage. In the operation of such a process it is common practice to maintain an acid ratio in the reaction chambers of about 1:1 by volume. Sufficient fresh acid of usually 98% concentration is brought in to replace the spent acid that is discarded. As a result of the violent agitation in each of the reaction chambers more acid passes over the weirs with the hydrocarbons than is brought in fresh. Therefore, to maintain the acid to hydrocarbon ratio in the reaction chambers it is necesasry that settled acid from chamber 52 be returned to reaction chamber 26.

Since the acid returned is the same concentration as the discarded acid, namely 88 to 90% depending on the quality of alkylate produced and other operating factors, the concentration of the acid in all but the final reaction chamber is reduced.

In accordance with our construction, the acid is partially separated from the alkylate at the top of the respective weirs 12, 14, and 16, so that most of the acid is immediately returned to its respective chambers 26, 27, and 28 and less acid is carried over the weir into the next chamber. Therefore, a much smaller quantity of the weakened acid must be returned from chamber 52 to chamber 26 and the concentration of the acid in chambers 26 and 27 is correspondingly increased.

At low rates of throughput the separation of acid from hydrocarbon at the top of each reaction chamber weir may become so efficient that the acid carry over with the hydrocarbons may become too small to supply sufficient acid to chamber 52 for discarding to maintain the desired minimum acid concentration. In this case acid will be bled from one chamber to the next through lines 36, 46, and 56.

The provision for settling and separation of the acid-hydrocarbon layers and their rehandling in the predetermined manner by completely separating the withdrawal section from the rapid mixing and foaming action of the main part of the system produces generally, a higher acid concentration, a greater alkylate yield, and a reduced acid consumption by virtue of the limited amount of acid carry over with alkylate from the various mixing stages. There is thus better economy of operation with no substantial increase of cost which has proved quite effective in such constructions.

We claim:

1. A liquid countercurrent contact apparatus for alkylating hydrocarbons and comprising a horizontal longitudinal sealed tank having a plurality of mixing compartments therein formed by a plurality of impervious, vertical walls, transversely positioned within said vessel, a motor driven agitator in each compartment, reactant inlet means to each compartment, a discharge outlet in the upper part of each compartment to permit gravitational flow of reactants from one mixing compartment to the next adjacent mixing compartment, a settling trap in each compartment adjacent said discharge outlet positioned on the impervious vertical wall on the upstream side of gravitational flow and comprising an impervious bottom downwardly inclined toward and abutting the impervious vertical wall, a substantially vertical pervious barrier wall comprising metallic fibers at the outer edge of said bottom and extending upwardly above the upper limit of the said impervious vertical wall to effectively coalesce and coagulate reactants passing therethrough, a trap out chamber in the bottom of the adjacent upstream mixing compartment, and a downcomer in the bottom of said trap extending to said trap out.

2. A liquid countercurrent contact apparatus as claimed in claim 1 in which the pervious barrier wall comprises stainless steel fibers.

3. An apparatus for alkylating hydrocarbons in the presence of sulfuric acid catalyst which comprises a horizontal longitudinal sealed vessel having reactant inlets at one end and a product outlet at the opposite end, a plurality of mixing compartments in said vessel formed by impervious, transverse walls, said walls decreasing in height from the reactant inlet end of said vessel to provide flow of reactants in a cascade manner through said vessel, a motor driven agitator in each mixing compartment, a settling trap in each mixing compartment positioned on the impervious wall on the upstream side thereof and into which reactants pass prior to flowing into the next adjacent mixing compartment, said settling trap having a bottom wall downwardly inclined toward and abutting the impervious wall, a pervious upright wall of metallic fibers at the outer edge of the bottom of said trap extending upwardly above the upper limit of the impervious transverse wall on which said trap is positioned to effectively coalesce and coagulate reactants passing therethrough, a trap out chamber at the bottom of the mixing chamber in which said settling trap is positioned, a downcomer in the bottom of said trap extending downwardly into said trap out chamber, and acid concentration control conduits interconnecting the trap out chamber of one mixing compartment with the next adjacent downstream mixing compartment.

References Cited in the file of this patent

UNITED STATES PATENTS

| | | |
|---|---|---|
| 1,375,740 | Studebaker | Apr. 26, 1921 |
| 1,641,843 | Fisher | Sept. 6, 1927 |
| 1,831,265 | Schonberg | Nov. 10, 1931 |
| 1,938,982 | Smith | Dec. 12, 1933 |
| 2,084,342 | Houghton | June 22, 1937 |
| 2,248,665 | Fisher | July 8, 1941 |
| 2,266,521 | Van Dijck | Dec. 6, 1941 |
| 2,311,144 | Wickham et al. | Feb. 16, 1943 |
| 2,429,205 | Jenny et al. | Oct. 21, 1947 |
| 2,443,694 | Pevere et al. | June 22, 1948 |
| 2,476,750 | Matuszak | July 19, 1949 |